Patented Oct. 24, 1939

2,177,547

UNITED STATES PATENT OFFICE 2,177,547

DIARYLDITHIOCARBAMYL DERIVATIVE AND METHOD OF MAKING THE SAME

Paul C. Jones, Akron, Ohio, assignor to The B. F. Goodrich Company, New York, N. Y., a corporation of New York No Drawing. Application July 28, 1937, Serial No. 156,172

10 Claims. (Cl. 260—455)

This invention relates to a new class of accelerators of rubber vulcanization and to the method for preparing the same. The chief object of the invention is to provide a new accelerator for the vulcanization of rubber and sulphur mixtures, which will produce a vulcanized product having a high tensile strength and other desirable mechanical properties.

I have discovered that by reacting approximately equimolar quantities of an alkali metal salt of a diaryl dithiocarbamic acid, an ammonium halide, and formaldehyde, I obtain a new chemical product which is a very desirable accelerator of vulcanization. The product when properly prepared is a crystalline compound which exhibits a definite melting point when pure. Ultimate analysis of the purified product and a variety of chemical tests give results satisfactory for a compound which may be termed tris (diarylthiocarbamylmercaptomethyl) amines of the probable structural formula

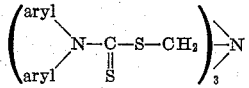

It is my theory, though it is not my intention to base the patentability of my method thereon, that the reaction proceeds according to the following empirical equation:

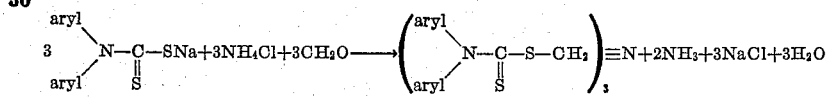

In practice, however, an excess of formaldehyde has been found to give better yields.

I usually use a sodium diaryl dithiocarbamate as a reactant, though other alkali metal salts may be used. For example, the sodium salt of diphenyl dithiocarbamic acid or the similar ditolyl (ortho, meta, para or mixed), dinaphthyl (alpha, beta or mixed), dixenyl, phenyl-naphthyl, phenyl-xenyl, phenyl-cumyl, phenyl-p-isopropenylphenyl, p-allylphenyl-beta-naphthyl, phenyl-p-isopropoxyphenyl, phenyl-p-hydroxyphenyl, phenyl-p-phenyloxyphenyl, di-o-anisyl, phenyl-p-chlorphenyl, phenyl - m - bromphenyl, phenyl - p - dimethylaminophenyl, phenyl - p - methylamino - phenyl, phenyl-p-anilinophenyl, phenyl-p-nitrophenyl, phenyl-p-acetylamidophenyl, or other like diaryl dithiocarbamates may be used. The term "aryl" is therefore to be understood as including substituted aryl groups unless it is specifically limited to hydrocarbon aryl groups. The sodium salts of the diarylarylene bis dithiocarbamic acids such as sodium diphenylphenylene bis dithiocarbamate may also be used. In performing the reaction, I never employ an excess of the dithiocarbamate.

Ammonium chloride is the most convenient ammonium halide to use in this reaction. While I usually use the dithiocarbamate and ammonium halide in equimolar quantities, I may use a slight excess of the ammonium halide if desired.

I usually use the formaldehyde in a 40% solution, though it may be supplied to the reaction mixture in any other form. Though I may use equimolar quantities of the dithiocarbamate and formaldehyde, much better yields are obtained by using 1½ mols of the formaldehyde, and I may use as much as 2 mols of formaldehyde to 1 mol of dithiocarbamate.

At the start of the reaction, the temperature of the reaction mixture containing the dithiocarbamate should not be much above ordinary room temperatures, the best yields being secured if the reaction is started at below 30° C. The dithiocarbamates are rather unstable at elevated temperatures, and will largely decompose if they are present in a hot solution. If the reaction is started at a suitable temperature, however, the reaction mixture may safely be heated to a temperature of 75° C. or even higher. At these elevated temperatures the reaction may reach completion in as little as two hours, but I prefer to heat the reaction mixture slowly to a temperature of about 50° C. in which case the reaction may require as long as twelve hours to reach completion. As the temperature is increased to 75° C. or higher, there is an increasing tendency to form resinous by-products instead of the crystalline compounds which are the preferred accelerators of this invention.

In actual practice, I perform the reaction in water solution in a vessel provided with a suitable stirring device and heating mechanism. I introduce a water solution of sodium diphenyl dithiocarbamate into the vessel, and add with stirring enough 40% formaldehyde solution to produce a molal ratio of formaldehyde to dithiocarbamate of about 1½ to 1. I then add enough ammonium chloride solution to produce a molal ratio of ammonium chloride to dithiocarbamate of about 1:1.

I pass steam into the charge until the temperature is 50° C. The steam is then turned off, and the stirring is continued for 8 hours. The product is filtered and washed in a filter press until no odor of formaldehyde is present in the wash water. The product, when dried at not over 140° F. has a melting point of from 160°–165° C. The melting point may be raised to 183°–186° C. by a methanol extraction and to 195° C. by recrystallization from a chloroform-methanol mixture. By repeated crystallization from o-dichlorbenzene a pure product having a melting point of 220°–221° C. and believed to be tris (diphenylthiocarbamylmercaptomethyl) amine is obtained. Similar products may be obtained by substituting other diaryl dithiocarbamates such as sodium phenyl beta-naphthyl dithiocarbamate or indeed any of the equivalent materials recited above.

It is to be understood that the specific examples given above are merely illustrative of one manner in which the invention may be practiced and that numerous modifications may be made in its various details. The scope of this invention is accordingly not to be limited to the specific examples herein set forth, but it is to be limited only as required by the prior art and as indicated in the appended claims.

I claim:

1. The process which comprises reacting approximately equimolar quantities of an alkali metal salt of a diaryl dithiocarbamic acid and an ammonium halide with at least an equimolar quantity of formaldehyde.

2. The process which comprises reacting approximately equimolar quantities of a sodium diaryl dithiocarbamate and ammonium chloride with an excess of formaldehyde.

3. The process which comprises reacting approximately equimolar quantities of a sodium di(hydrocarbon-aryl) dithiocarbamate and ammonium chloride with an excess of formaldehyde.

4. The process which comprises reacting in water solution approximately equimolar quantities of an alkali metal salt of a diaryl dithiocarbamic acid and ammonium chloride with an excess of formaldehyde.

5. The process which comprises reacting a sodium diaryl dithiocarbamate, ammonium chloride, and formaldehyde in the approximate molal ratio of 1:1:1½.

6. Tris (diarylthiocarbamylmercaptomethyl) amines.

7. Tris (phenylarylthiocarbamylmercaptomethyl) amines.

8. Tris (diphenylthiocarbamylmercaptomethyl) amine.

9. Tris (phenyl alpha-naphthylthiocarbamylmercaptomethyl) amine.

10. Tris (phenyl beta-naphthylthiocarbamylmercaptomethyl) amine.

PAUL C. JONES.